UNITED STATES PATENT OFFICE.

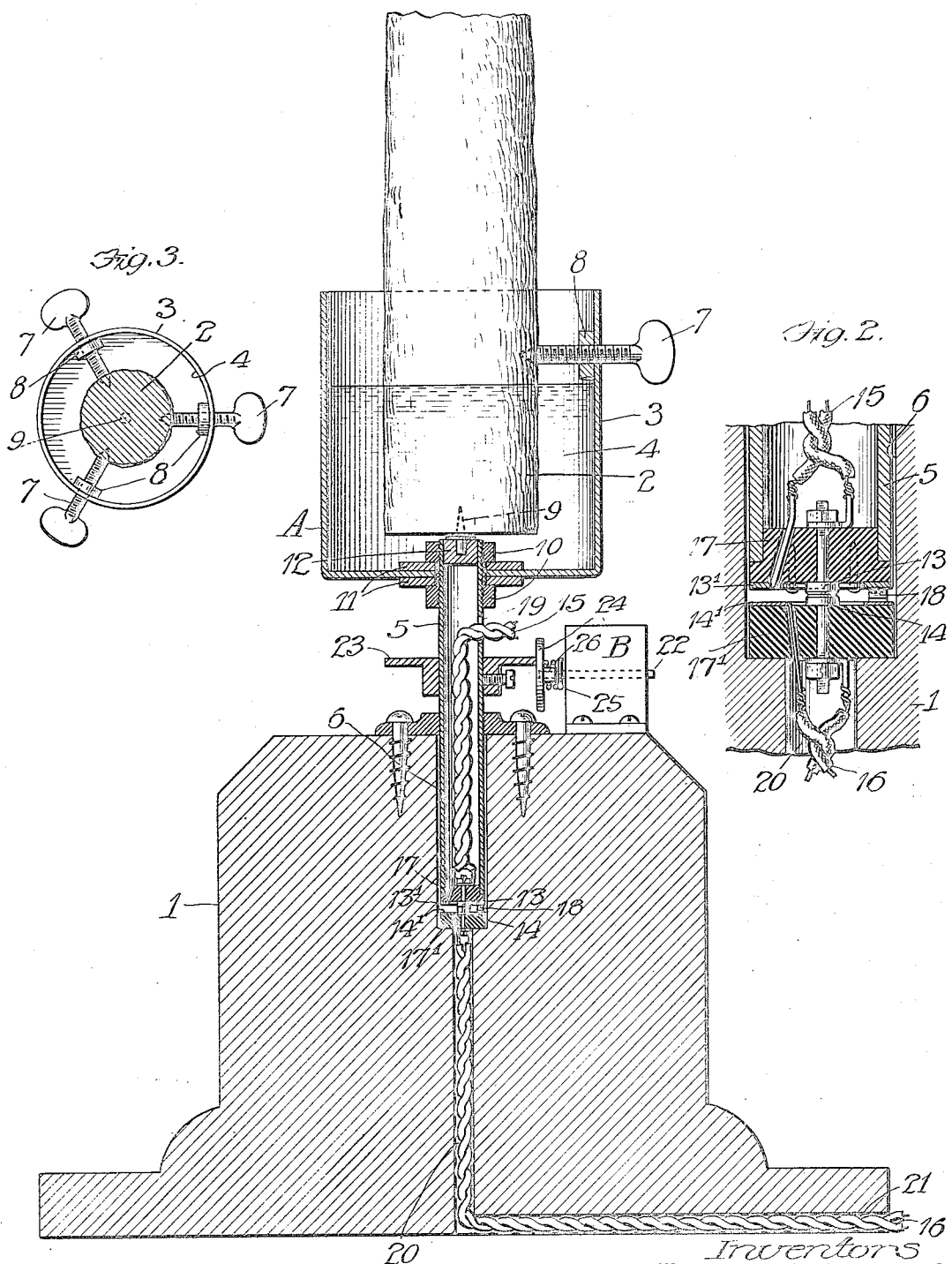

WILLIAM R. SAMUEL AND ROY WERTHEIMER, OF CHICAGO, ILLINOIS.

HOLDER FOR CHRISTMAS-TREES.

1,372,777. Specification of Letters Patent. Patented Mar. 29, 1921.

Application filed May 17, 1920. Serial No. 381,990.

*To all whom it may concern:*

Be it known that we, WILLIAM R. SAMUEL and ROY WERTHEIMER, both citizens of the United States, and residents of Chicago, in the county of Cook and State of Illinois, have invented a certain new and useful Improvement in Holders for Christmas-Trees, of which the following is a specification.

This invention relates to holders for Christmas trees.

The object of the invention is to provide an improved holder for Christmas trees constructed and arranged to permit said tree to be rotated and equipped with electrical connections adapted for connecting an electric lighting circuit on a tree supported in said holder with an electric generator.

To effect the foregoing objects, a Christmas tree holder of our invention comprises a supporting base of sufficient size and weight to form a stable support for the tree, preferably without attachment to the floor or other supporting surface, a holder proper in which the tree is adapted to be secured, rotatably mounted in said base, electrical contacts mounted on the rotatable holder adapted to be electrically connected with the lighting circuit on the tree, and corresponding electric contacts on the supporting base adapted to be electrically connected with an electrical generator. The invention also comprises the various other features, combinations of features and details of construction hereinafter described and claimed.

In the accompanying drawings, in which our invention is fully illustrated,

Figure 1 is a vertical, central, sectional view of a Christmas tree holder of our invention.

Fig. 2 is an enlarged fragmentary sectional view showing the electrical contacts and connections for lighting the tree; and Fig. 3 is a top plan view of the holder proper showing the means for supporting a tree therein.

Referring now to the drawings, 1 designates the supporting base of the holder, said supporting base being adapted to rest upon a floor or other support and being sufficiently large and heavy to provide a stable support for the tree of the size which it is intended to receive, preferably without screwing or otherwise attaching said supporting base to the floor or other supporting surface.

In practice, said base 1 will preferably be made of wood, but our invention contemplates equally making it of cement, cast metal, terra cotta or other plastic material. Also, while the shape of said supporting base is immaterial, it will preferably be designed so as to present an artistic and attractive appearance.

The tree, the body of which is indicated at 2, is supported directly in a holder proper designated, as a whole, A, rotatably mounted in the supporting base 1.

As shown, said holder comprises an enlarged upper portion 3 provided with a socket 4 adapted to receive the lower end of the tree, and a shank 5 to the upper end of which said socket member 3 is secured, rotatably mounted in a hole or opening 6 formed in the supporting base 1, preferably at the center of the top thereof.

To adapt our improved holder for use with trees of different sizes, the socket member 3 and the socket 4 therein are made relatively large as compared with the diameters of the body portions of the trees which they are designed to receive and the body portions of said trees are adapted to be secured in upright position in said socket member by screws 7 secured in screw threaded engagement with corresponding holes or openings formed in the side wall of the socket member 3. In practice, we have used three screws 7 positioned at equal distances from each other, but our invention contemplates the use of any desired number of supporting screws.

In practice, also, we preferably make the socket member 3 of heavy galvanized iron, though our invention contemplates the use of other suitable materials. When said socket member is made of galvanized iron or other relatively light material, it will preferably be reinforced by washers 8 soldered thereto at the points where the threaded openings which receive the screws 7 are formed.

To prevent tilting of the tree in the socket member 3, a pin 9 is secured in the bottom of the socket member 3, which projects upwardly into the socket 4, preferably at the center thereof, and which is adapted to engage the lower end of the body portion of the tree. Said supporting screws 7 and pin 9 will operate in an obvious manner to prevent tilting of the tree.

The screws 7 are preferably wing screws, thus providing for conveniently operating same by hand.

In the preferable construction shown, the shank 5 is formed from a piece of electrical conduit, or the like, and extends through a hole or opening formed in the bottom of the socket member 3, said socket member being secured to the upper end of said shank by means of clamping nuts 10 threaded thereto at opposite sides of the bottom of said socket member, washers 11 being preferably inserted between said clamping nuts at both sides of the bottom of said socket member and being likewise preferably threaded to said shank.

In order to prevent the needles of the tree from drying out and falling off, as will otherwise very soon happen, the socket member 3 is preferably made water tight and is filled with water to such depth that the lower end of the body portion of the tree will be immersed therein. In practice, any tendency to leakage around the shank 5 may be prevented by the use of packing gaskets inserted between the washers 11 and the bottom of said socket member and between the clamping nuts 10 and said washers. If desired, our invention contemplates soldering said washers 11 directly to the bottom of said socket member.

Leakage through the bore of said shank 5 is prevented by means of a plug 12 secured in the upper end thereof. Said plug will preferably be made of wood but may be made of other suitable material, and the pin 9 is preferably secured directly therein, preferably extending only part way through the same, however, thus preventing all tendency to or danger of leakage.

The electrical connections for the lighting circuit of the tree are as follows:—Mounted at the lower end of the shank 5 and in the bottom of the hole or opening 6 in the supporting base 1 in which said stem or shank is rotatably mounted, are corresponding sets of electrical contacts, designated, respectively, 13, $13^1$ and 14, $14^1$, the contacts 13, $13^1$ being connected by electrical conductors 15 with the electric lighting circuit of the tree and the contacts 14, $14^1$ being connected by electrical conductors 16 with an electrical generator, not shown. Engagement of the contacts 13, $13^1$ and 14, $14^1$ is adapted to be effected and maintained by the weight of the holder proper A and of the tree 2 supported therein and the electric circuit thus formed is preferably adapted to be controlled by usual snap or switch sockets, also not shown.

As shown, said contacts are mounted on bases 17, $17^1$ made of porcelain, vulcanized fiber, hard rubber or other insulating material, secured, respectively, to the lower end of the shank 5 and at the bottom of the shank bearing 6 in the supporting base, the contacts 13 and 14 being arranged substantially axially of said shank 5 and shank bearing 6, and the contacts $13^1$, $14^1$ consisting of annular rings secured to the insulating bases 17, $17^1$ substantially concentric with said contacts 13 and 14, and the relation being such that when the shank 5 is fully seated in its bearing 6, the opposed contacts 13, 14 and $13^1$, $14^1$ will engage each other.

If desired, one of the contacts $13^1$, $14^1$ may be provided with spring contact points 18, which will extend slightly beyond the surface of said contact, and slightly above the contact 13 or 14 corresponding to the contact $13^1$ or $14^1$ on which said spring contacts are formed, the relation being such that said spring contact will yield under the pressure of the holder A and of the tree supported therein, thus insuring effective operating engagement of the opposed contacts $13^1$ and $14^1$ without the nicety of adjustment which would otherwise be necessary.

Said spring contact points may conveniently be formed by soldering or otherwise securing to the contact on which they are to be formed, what may be described as leaf springs of such thin material, as thin sheet copper, that they will yield readily under the weight of the holder proper A and of a tree supported therein.

The various contacts will be provided with usual binding posts to which the conductors 15 and 16 are connected.

The conductors 15 connected to the contacts 13, $13^1$ secured to the lower end of the shank 5 extend through the bore of the pipe forming said shank to a point above the top of the supporting base 1 when the shank 5 is fully seated therein, and passes out of said shank through an opening 19 formed in the side thereof.

In like manner, the conductors 16 connected to the contacts 14, $14^1$ at the bottom of the hole or opening 6 extend through a hole 20 which extends from the bottom of the supporting base to said hole or opening 6, and thence along a groove 21 formed in the bottom of said supporting base to the edge thereof.

While we consider the particular form of contacts shown as preferable, we do not desire to limit ourselves thereto, as other forms of contacts may readily be devised by electricians of ordinary skill, which will answer the purpose equally well.

Preferably, also, our invention comprises means in connection with means for illuminating the tree, either electric lights or candles, for imparting rotation to said holder A and thus to the Christmas tree, whereby a novel and very attractive lighting effect will be produced.

To effect the object of our invention as it relates to this feature, we mount a motor indicated at B upon the supporting base 1 of the holder, the driving shaft 22 of which is operatively connected with the holder proper A, so that said holder may be rotated thereby.

Our invention contemplates the use of any desired or approved form of motor B, either electrical or spring driven, such as can readily be devised by a mechanic skilled in the art or can be purchased in the open market. For this reason, it is considered unnecessary to either show or describe the construction of said motor in detail, as this would merely result in unnecessarily increasing the length of the specification.

In like manner, our invention contemplates any desired or approved form of driving connection between the motor shaft and the holder proper A. A simple form of driving connection which we now consider to be preferable consists of a disk 23 secured to rotate with the shank 5 of the holder A, the perimeter of which runs in contact with the face of a disk 24 secured to the shaft 22 of the motor B so as to rotate therewith, and preferably also so as to admit of limited movement endwise thereof, the face of said disk 24 being held yieldingly in contact with the perimeter of the disk 23 by means of a coiled spring 25 inserted between said disk and a fixed collar 26 on said motor shaft. Also, in order to provide for varying the speed of rotation of the holder A, the disk 23 is preferably secured to the shank 5 of said holder so as to be adjustable lengthwise thereof so that it may engage the face of said disk 24 at different distances from the axis of rotation of the motor shaft 22, as it is desired to rotate the tree faster or slower. As shown, the disk 23 is adapted to be secured in desired adjustment on the shank 5 by means of a set screw threaded through the hub of said disk, in a familiar manner.

We claim:—

An apparatus for displaying an electrically-illuminated Christmas tree embodying a base, a tree-holder having a hollow shank depending into said base and rotatably supported therein, means for rotating the tree-holder with its shank, a pair of insulation-blocks one on the base and the other carried by the lower end of said shank, a pair of conductors extending to each of said blocks, the pair connected to the upper block being housed in the hollow shank, and two pairs of contacts carried by said blocks, one pair being centrally arranged so as to form a stepped bearing for the rotatable tree-holder.

In testimony, that we claim the foregoing as our invention, we affix our signatures this 11th day of May, 1920.

WILLIAM R. SAMUEL.
ROY WERTHEIMER.